United States Patent Office 3,089,832
Patented May 14, 1963

3,089,832
POLYMERIC LUBRICATING OIL ADDITIVES
James F. Black, Convent Station, and Donald A. Guthrie, Cranford, N.J., assignors to Esso Research and Engineering Company, a corporation of Delaware
No Drawing. Filed Aug. 1, 1956, Ser. No. 601,387
10 Claims. (Cl. 204—158)

This invention relates to polymerization and more particularly relates to a novel method for preparing novel polymeric products which contain at least two constituent monomers by subjecting mixtures of polymeric materials and polymerizable monomers to high energy ionizing radiation. The invention also relates to the novel polymeric products so produced and to their uses. The present invention relates particularly to oil-soluble polymeric products obtained by grafting monomers to polymeric isobutylene compounds by means of high intensity ionizing radiation and to the uses of such products as lubricating oil additives.

The present application is a continuation-in-part of Serial No. 550,499, filed December 1, 1955, by the present applicants, now abandoned.

The commercial uses of copolymers are many and varied. For example, copolymers are today widely utilized as viscosity index improvers for lubricating oils, sludge dispersants for heating oils, synthetic rubbers for tires, plasticizers, drying oils, coating materials and the like. In general, these copolymers have been made almost exclusively by employing chemical catalysts for the polymerization reactions which generally have required elevated or reduced temperatures and elevated pressures. The resultant copolymers have generally differed from each other only in their molecular weights and the proportions and types of constituent monomers.

A unique method has now been found for preparing novel polymeric products which contain at least two different constituent monomers, which method comprises subjecting a mixture of (1) a polymeric phase containing at least one constituent monomer and (2) a monomeric phase containing at least one polymerizable monomer to high energy ionizing radiation, wherein one of the phases contains at least one different monomer from the monomers contained in the other phase, whereby at least a portion of the monomeric phase is copolymerized with at least a portion of the polymeric phase. In effect, this novel method of the present invention makes it possible to "tailor-make" a polymeric product for a given product application as it permits preparation of a polymeric product having practically any desired molecular structure. The present invention thus makes it possible to prepare multi-functional petroleum additives; e.g., lubricating oil additives; improved synthetic rubbers and generally provides the art with a means for preparing polymeric products having a wide variety of improved properties and new applications.

In addition to preparing novel polymeric products, the present method has a number of process advantages over conventional copolymerization methods of the prior art. More specifically, these advantages are:

(1) Copolymerization by means of high energy ionizing radiation is generally less expensive than copolymerization carried out by conventional chemical procedures. This economic advantage is derived in part from the ready availability of large quantities of fission by-products from atomic reactors. The present method is also economically advantageous since if desired it may be carried out at about room temperature and/or at atmospheric pressure and thus does not require the relatively low or relatively high reaction temperatures and pressures required in the conventional copolymerization processes.

(2) The reaction is easily controlled. With chemical copolymerization catalysts, the rate at which the chain initiators are produced depends not only upon the concentration of the catalyst and the temperature, but also upon little understood secondary chemical changes in the catalyst decomposition products. The rate at which chain initiating high energy ionizing radiation is produced by the radioactive source is constant. Therefore, at a given temperature the copolymerization will be quite even and not subject to sudden acceleration or deceleration as is the case with chemical catalysts. Also, with certain conventional catalysts it is necessary to heat the reaction mixture to initiate the copolymerization process after which rapid cooling may be required so that the polymerization does not get out of control. Difficult control problems of this type are avoided in accordance with the present invention.

(3) There is no catalyst contamination in the products copolymerized by high energy ionizing radiation. Since the radioactive material need not come in direct contact with the reactants, the problem of removing initiating materials from the resulting polymer does not exist. The absence of catalyst contamination in the final product results in greater thermal stability of the copolymer. It should be pointed out that gamma ray irradiation does not make a substance radioactive.

(4) Radiation initiation is readily adaptable for continuous copolymerization processes. Since the irradiation is given out on a 24-hour basis from an irradiation source, and since its emission is regular and not affected by temperature or other outside phenomena, the catalytic effect is controlled in radiation initiated copolymerizations solely by the time of residence of the reactant within the irradiation zone. For all practical purposes, the initiator is not consumed as is the case with chemical initiators. In addition, a radiation source, such as a gamma source, produces no products which must be removed from the reaction zone. These features permit the design of a plant which can manufacture polymer on a 24-hour basis by merely pumping monomers through the radiation given out by a suitable source.

The high energy ionizing radiation may be supplied by naturally occurring radioactive materials, such as radium and its compounds, which emit alpha, beta and gamma rays. Fission by-products of processes generating atomic power and/or fissionable materials which emit high energy gamma rays, afford a highly desirable and most abundant source of radioactivity suitable for the purposes of the invention. These by-products include elements with atomic numbers ranging from 30 (zinc) to 63 (europium) and their compounds. They are formed in the course of converting uranium, plutonium and other fissionable material in an atomic reactor.

Materials made radioactive by exposure to neutron radiation, such as radioactive cobalt ($Co^{60}$), europium 152 or europium 154, which emit gamma rays, may likewise be used. Radioisotopes emitting beta rays may also be employed. Suitable sources of high velocity electrons are also the beams of electron accelerators, such as the Van de Graaff generator or the betatron. In general, however, high intensity gamma radiation and its well-known sources, such as nuclear fission by-products and materials made radioactive by neutron radiation are particularly preferred for the purposes of the invention mainly because of the relatively high penetrating power of the gamma rays and the availability and ease of application of these sources of gamma radiation. Also a combination of gamma rays and neutrons is a preferred type of radiation. Such combinations of gamma rays and neutrons may be obtained from nuclear reactors (atomic piles).

The polymeric phase of the mixture which is subjected to the high energy ionizing radiation is a polymeric material containing at least one constituent monomer. More specifically, the polymeric material may be a homopolymer, that is, a polymeric material consisting of a single constituent monomer, or it may be a copolymer consisting of two or more constituent monomers. These polymeric materials may be prepared by conventional polymerization or copolymerization techniques well known in the art. The preparation of such polymeric materials does not constitute part of this invention. The molecular weights of the polymeric materials may vary within rather wide limits and will depend upon the final polymeric product desired. In general the molecular weights (Staudinger) of the polymeric materials useful in this invention will vary from about 500 to $5 \times 10^6$, usually about $10^3$ to $5 \times 10^5$. Specific examples of polymeric materials which may be subjected to the high energy ionizing radiation in admixture with the monomers include the following:

HOMOPOLYMERS

Polymers of mono-olefins, e.g., ethylene, propylene, isobutylene, styrene, α-methyl styrene, etc.

Polymers of diolefins, e.g., butadiene, isoprene, etc.

Polymers of halo olefins, e.g., vinyl chloride, tetrafluoroethylene, trifluorochloroethylene, etc.

Polymers of esters of acrylic and of methacrylic acids, e.g., methyl acrylate, decyl acrylate, methyl methacrylate, lauryl methacrylate, mixed $C_8$ to $C_{18}$ methacrylates, diethylaminoethyl methacrylate, etc.

Polymers of vinyl esters, e.g., vinyl acetate, vinyl isobutyrate, vinyl 2-ethylhexoate, the vinyl ester of coconut acids, the vinyl ester of $C_{10}$ Oxo acids made by the oxonation of tripropylene, etc.

Polymers of vinyl ethers, e.g., vinyl isobutyl ether, vinyl decyl ether, and vinyl ether of $C_8$ Oxo alcohol made by the oxonation of $C_7$ monoolefin (propylene-butylene copolymer), etc.

Polymers of esters of α,β-unsaturated dibasic acids, e.g., ethyl fumarate, octyl fumarate, lauryl maleate, the aconitate and itaconate esters of mixed alcohols obtained by the hydrogenation of coconut oil acids, etc.

Polymers of unsaturated nitriles, e.g., acrylonitrile, methacrylonitrile, etc.

COPOLYMERS

Copolymers of various olefins, e.g., ethylene and propylene; isobutylene and styrene; butadiene and isobutylene; butadiene and methyl styrene; etc.

Copolymers of olefins and unsaturated esters, e.g., isobutylene and ethyl fumarate; octadecene and lauryl maleate; styrene and tetradecyl fumarate; etc.

Copolymers of various esters of unsaturated acids, e.g., ethyl methacrylate and octyl fumarate; methyl acrylate and dodecyl maleate; octadecyl fumarate and octyl aconitate; methyl methacrylate and methyl itaconate; isopropenyl acrylate and tetradecyl acrylate; etc.

Copolymers of vinyl esters and unsaturated acid esters, e.g., vinyl acetate and fumarate esters of tallow alcohols; vinyl 2-ethyl butyrate and isodecyl maleate; isopropenyl acetate and the itaconic esters of coconut alcohols; etc.

Copolymers of unsaturated nitrogen-containing compounds and other unsaturated compounds, e.g., acrylonitrile and butadiene; aminoisobutyl methacrylate and tetradecyl methacrylate; methacrylamide and vinyl 2-ethylhexoate; etc.

The monomeric phase of the mixture which is irradiated in accordance with the present invention contains at least one polymerizable monomer. By the expression "polymerizable monomer" is meant a monomer which is capable of polymerizing in the presence of high energy ionizing radiation. The polymerizable monomers useful in this invention will contain at least one double bond. More specifically, these polymerizable monomers may be monoolefins, diolefins, halo olefins, esters of acrylic acid, esters of methacrylic acid, vinyl esters, vinyl ethers, esters of α,β-unsaturated dibasic acids, unsaturated nitriles, etc. It will be understood that mixtures of different monomers may be employed. Specific examples of polymerizable monomers useful in the present invention include the following:

MONOMERS (Organic compounds containing at least one olefinic double bond or acetylenic triple bond)

Monoolefins, e.g., ethylene, propylene, n-butylene, tetramethyl nonene, octadecene, styrene, methyl styrene; etc.

Diolefins, e.g., butadiene, isoprene, dimethyl butadiene, pentadiene, cyclopentadiene, methylcyclopentadiene, etc.

Halo olefins, e.g., vinyl chloride, tetrafluorooethylene, trifluorochloroethylene, etc.

Esters of acrylic and of methacrylic acids, e.g., methyl acrylate, decyl acrylate, methyl methacrylate, lauryl methacrylate, mixed $C_8$ to $C_{18}$ methacrylates, diethylaminoethyl methacrylate, etc.

Vinyl esters, e.g., vinyl acetate, vinyl isobutyrate, vinyl 2-ethylhexoate, the vinyl ester of coconut acids, the vinyl ester of $C_{10}$ Oxo acids made by the oxonation of tripropylene, etc.

Vinyl ethers, e.g., vinyl isobutyl ether, vinyl decyl ether, the vinyl ether of $C_8$ Oxo alcohol made by the oxonation of $C_7$ mono-olefin (propylene-butylene copolymers), etc.

Esters of α,β-unsaturated dibasic acids, e.g., ethyl fumarate, octyl fumarate, lauryl maleate, the aconitate and itaconate esters of mixed alcohols obtained by the hydrogenation of coconut oil acids, etc.

Unsaturated nitriles, e.g., acrylonitrile, methacrylonitrile, etc.

It will be noted that one of the two phases (i.e., the polymeric phase and the monomeric phase) in the mixture to be irradiated contains at least one monomer different from the monomers of the other phase. Thus the present invention does not pertain to the simple polymerization of a single monomer nor to the simple copolymerization of two or more monomers, but rather to the copolymerization of an already existing polymeric material with a different system of monomers.

The irradiation of the mixture of the polymeric material and the monomeric phase may be carried out generally at temperatures in the range of about −150° F. to about 400° F., usually about 0 to 250° F. However, usually it will be desired to carry out the irradiation at room temperatures, e.g., about 60° to 80° F. The irradiation may be carried out under vacuum or at atmospheric or elevated pressures generally within the range of about 0.1 to 500 atmospheres, usually about 0.5 to 100 atmospheres. Normally, however, it will be convenient to operate at about atmospheric pressure. The present invention is operable utilizing irradiation times of a few seconds to 100 hours or more, usually about 0.01 to 50 hours, utilizing radiation intensities generally in the range of about $10^3$ to $10^8$, usually about $5 \times 10^4$ to $10^7$, roentgens per hour. The total radiation dosages useful in the present invention are generally within the range of about $5 \times 10^4$ to $5 \times 10^7$, usually about $2 \times 10^5$ to $10^7$, roentgens, or equivalent radiation dosage of neutrons are employed. Radiation sources of about 10 to $10^8$, usually about 300 to $10^6$ equivalent curies may be employed. It will be understood that the total radiation dosage will depend a great deal upon the final product which is desired. Similarly the relative proportions of the two phases (i.e., the polymeric phase and the monomeric phase) which are employed will depend upon the particular polymeric product desired. Generally though the proportion of the polymeric material will be in the range of about 0.1 to 99.9%, usually about 40 to 90% by weight of the mixture and the proportion of the monomeric phase will be about 0.1 to 99.9%, usually about 10 to 60% by weight of the mixture.

The present invention is best carried out in liquid phase. In this connection it should be noted that if the polymeric material is soluble in the monomeric phase, it is unnecessary to utilize additional solvents. If the polymeric material is not appreciably soluble in the monomeric phase at the concentrations employed, it is preferred to use an inert liquid diluent in which both the polymeric material and the monomeric phase are soluble. Specific examples of essentially inert liquid solvents useful in the present invention include hexane, octane, cyclohexane, benzene, toluene, xylene, ethanol, isopropanol, isopropyl ether, ethyl or amyl acetate and petroleum lubricating oil or white oil fractions.

In the event that there is no mutual solvent for both the polymeric material and the monomeric phase, the present invention can be carried out in (1) an emulsion system, that is, a system generally wherein one of the phases is soluble in the solvent selected whereas the other one is dispersed in the solution of the solvent and the soluble phase; or (2) by mechanical dispersion of the monomer into the polymer by such well known methods as milling, kneading and the like.

The structure of the final polymeric product produced in accordance with this invention will depend upon a number of factors including (1) the polymeric material (phase), (2) the monomeric phase, (3) the relative proportions of the polymeric phase and the monomeric phase, (4) the solvent employed and (5) the temperature of the reaction. More specifically, polyolefins (including diolefins) will cause the formation of a more cross-linked final polymeric product than in the case when solely monoolefins are employed as the monomeric phase. Mixtures containing relatively high aromatic contents will require higher radiation dosages than will mixtures containing relatively low aromatic contents. Higher irradiation temperatures will cause the formation of shorter monomer side chains on the polymeric material. Relatively high concentrations of monomer will promote the formation of long side chains on the polymeric material. The use of aromatic solvents may produce polymeric products having relatively low molecular weights and containing short monomer side chains.

A polymeric product of this invention may comprise a mixture of copolymers containing different proportions of constituent monomers. The polymeric product may be used per se, or the polymeric product may be separated into a number of different fractions, each fraction containing polymeric molecules having essentially the same types and proportions of constituent monomers. This separation may be conveniently carried out by the use of selected solvents. More specifically, polymeric molecules having a high aromatic content are generally readily soluble in aromatic solvents such as benzene, toluene and the like. Aliphatic hydrocarbon polymeric molecules containing a high proportion of aliphatic hydrocarbon monomers are readily soluble in aliphatic hydrocarbon solvents such as, for example, heptane, hexane and the like. Combinations of aromatic solvents and aliphatic hydrocarbon solvents may also be employed to separate intermediate fractions of the polymeric product. Similarly oxygen-containing solvents may be employed to dissolve polymeric molecules containing high proportions of oxygen-containing constituent monomers. Thus, by the use of selected solvents, it is possible to obtain very specific polymeric products having a desired molecular structure for a particular application.

Specific examples of particularly useful polymeric products produced in accordance with the present invention are those obtained employing the following combinations of polymeric materials and monomers:

| Polymeric material | Monomer |
|---|---|
| Polystyrene | Butadiene. |
| Polybutadiene | Styrene. |
| Polyisobutylene | Isoprene. |
| Polyisoprene | Styrene. |
| Polyisobutylene | Do. |
| Polystyrene | Isoprene. |
| Polybutadiene | Acrylonitrile. |
| Polyacrylonitrile | Butadiene. |
| Polyvinyl acetate | Decyl fumarate. |
| Polydecyl fumarate | Vinyl acetate. |
| Polyisobutylene | Octadecene. |
| Do | Ethylene. |
| Butadiene-styrene copolymer | Isoprene. |
| Do | Acrylonitrile. |
| Butadiene-acrylonitrile copolymer | Styrene. |
| Do | Isoprene. |
| Isobutylene-styrene copolymer | Acrylonitrile. |
| Do | Butadiene. |
| Do | "Lorol" methacrylate. |
| Isobutylene-isoprene copolymer | Octadecene + styrene. |
| Do | "Lorol" fumarate. |
| Do | "Lorol" maleate. |
| Do | "Lorol" methacrylate. |
| Do | Styrene. |
| Do | Acrylonitrile. |

The above graft copolymers are useful as synthetic rubbers, film-forming materials, lubricant additives, etc.

The invention will be more fully understood by reference to the following examples. It is pointed out, however, that the examples are given for the purpose of illustration only and are not to be construed as limiting the scope of the present invention in any way.

*Example 1*

The following three compositions were subjected to high energy ionizing radiation: (1) a polyisobutylene having a Staudinger molecular weight of about 200,000, (2) a solution of 30% by weight of styrene and 70% by weight of toluene and (3) a solution of 30 weight percent of styrene, 68.5 weight percent of toluene and 1.5 weight percent of polyisobutylene (200,000 Staudinger molecular weight).

The irradiation of these three compositions was carried out as follows: The samples were placed in 2-oz. bottles which were sealed and inserted at room temperature (74° F.) into the center of a cylindrical cobalt 60 source with a strength of about 1400 curies and a radiation intensity of 555,000 roentgen/hour. After 36 hours the samples had been exposed to a total radiation dosage of $20 \times 10^6$ roentgens.

The following results were noted after irradiation of the aforedescribed three compositions:

TABLE I

[Gamma irradiation of polyisobutylene and styrene]

| Sample | Styrene conversion (weight percent) | Product properties | | |
|---|---|---|---|---|
| | | Appearance | Solubility | Other |
| Polyisobutylene (200,000 MW) | | Sticky gum | Soluble in heptane | Molecular weight degraded to about 10,000. |
| 30% (weight) styrene, 70% toluene | 28.4 | Clear, brittle solid | Insoluble in heptane, or heptane-benzene (25/1). | |
| 1.5% polyisobutylene, 30% styrene, 68.5% toluene. | 25.8 | Slightly rubbery solid | (a) 42% (wt.) soluble in heptane; (b) 31% soluble in heptane-benzene (25/1); (c) 27% insoluble. | (a) Rubbery solid, 57% styrene,[1] (b) Tough, hard solid, 88% styrene,[1] (c) Brittle solid, 100% styrene.[1] |

[1] Calculated from the C/H ratio of the fraction.

During exposure to ionizing radiation polyisobutylene is degraded to a lower molecular weight polymer. However, if the irradiation of polyisobutylene is carried out in the presence of styrene, side chains of polystyrene are grafted to the original polymer molecules present in the system (in this case polyisobutylene). The products which are obtained after fractionation combine the properties of both polymers. For example, fraction a, containing 57% styrene and 43% isobutylene, is quite tough and extremely flexible. Fraction b, with a higher styrene content of 88% is an extremely tough and hard polymer which exhibits, however, a certain amount of flexibility characteristic of polyisobutylene.

*Example 2*

In this example, the following two systems were investigated:

| Polymeric material | Monomer |
| --- | --- |
| (1) Polymer of vinyl-2-ethyl hexoate | Styrene. |
| (2) Polystyrene | Vinyl-2-ethyl hexoate. |

The following three polymers of vinyl-2-ethyl hexoate (VEH) were employed:

| VEH polymer: | Approximate molecular weight |
| --- | --- |
| A | 4300 |
| B | 2650 |
| C | 1100 |

The polystyrene utilized in this example had a molecular weight of about 10,000 Staudinger and was available commercially.

The aforedescribed two systems were then subjected to gamma irradiation utilizing in certain cases toluene and heptane as solvents and utilizing varying proportions of the polymeric material and monomer. The results of these experiments are shown in Table II. The irradiation was carried out in the same manner as Example 1 except that the source strength was about 750 curies of cobalt 60 with a radiation intensity of about 300,000 roentgen/hour.

TABLE II

[Graft copolymers of styrene and vinyl-2-ethyl hexoate (VEH) prepared using gamma radiation]

| Reaction system | | | Radiation dose (MR) | Copolymer Product[1] | |
| --- | --- | --- | --- | --- | --- |
| Styrene (percent weight) | VEH polymer | Solvent | | VEH content (weight percent) | Styrene conversion (percent) |
| 100 | | | 20 | | 34 |
| 90 | 10% A | | 20 | 10.9 | 84 |
| 75 | 25% A | | 20 | 16.3 | 94 |
| 50 | 50% A | | 20 | 25.3 | 84 |
| 75 | 25% B | | 20 | 15.0 | 95 |
| 75 | 25% C | | 20 | 11.4 | 93 |
| 30 | | 70% toluene | 20 | | 29 |
| 30 | 1.5% A | 68.5% toluene | 20 | 4.7 | 30 |
| 30 | 30% A | 60% toluene | 20 | 4.2 | 46 |
| 30 | 10% B | do | 20 | 5.4 | 43 |
| 30 | 10% C | do | 20 | 5.0 | 52 |
| 30 | | 70% heptane | 10 | | 24 |
| 30 | 10% A | 60% heptane | 10 | 24.7 | 22 |

| Reaction system | | | Radiation dose (MR) | Copolymer product[1] | |
| --- | --- | --- | --- | --- | --- |
| VEH monomer (percent weight) | Polystyrene | Solvent | | VEH content (weight percent) | VEH conversion (percent) |
| 30 | | 70% toluene | 10 | [2]100 | 55 |
| 30 | 10% | 60% toluene | 10 | 16.5 | 4.5 |

[1] Product purified twice by solution in toluene and precipitation into isopropanol. Vinyl-2-ethyl hexoate content was calculated from the oxygen content of the product.
[2] VEH polymer soluble in isopropanol. Isolated by evaporation.

The data presented in Table II show that irradiation of polyvinyl-2-ethyl hexoate dissolved with varying amounts of styrene resulted in products which contained from 75% to 89% of styrene grafted to the original polyvinyl-2-ethyl hexoate polymer. When toluene or heptane were used as solvents, the graft copolymers contained 95% and 75% of styrene respectively. The molecular weight of the original polyvinyl-2-ethyl hexoate polymer had no effect on the conversion of styrene obtained during the reaction, although it did influence the composition of the resulting graft copolymer (the lower molecular weight polyvinyl-2-ethyl hexoates giving rise to lower vinyl-2-ethyl hexoate contents in the copolymer product). Solvents, on the other hand, influence both the conversion of styrene and the copolymer composition. In toluene the conversion is higher than it is in heptane, while the vinyl-2-ethyl hexoate content of the copolymer prepared in toluene is lower than a corresponding product prepared in heptane.

In the reverse process, irradiation of a toluene solution of vinyl-2-ethyl hexoate monomer and polystyrene gave a product containing 16% of vinyl-2-ethyl hexoate grafted to the pre-formed polystyrene. Since neither polystyrene nor polyvinyl-2-ethyl hexoate degrade in molecular weight under the influence of ionizing radiation, these results show that breakdown of the pre-formed polymer under irradiation is not necessary for the successful preparation of graft copolymers.

The graft copolymers of styrene with either isobutylene or vinyl-2-ethyl hexoate prepared in accordance with this invention (Examples 1 and 2) are similar in appearance to polystyrene. However, they have the important advantage that the brittleness usually associated with pure polystyrene is no longer exhibited. The graft copolymers are extremely tough and considerably improved in flexibility.

It has been found that oil-soluble polymeric products obtained in accordance with the present invention by grafting various monomers to polymeric isobutylene compounds by means of high intensity ionizing radiation are very effective lubricating oil additives. Such products have been found to be useful as viscosity index improvers, sludge dispersants, detergents and/or pour depressants in mineral oils, etc., particularly in mineral lubricating oils. The present polymeric products cannot be prepared by irradiation of isobutylene monomer with other monomers, and can only be prepared by employing polymeric isobutylene compounds as initial reactants.

The polymeric isobutylene compounds may be either homopolymers of isobutylene or copolymers of isobutylene with other unsaturated monomers, which copolymers contain a major proportion of the isobutylene component, preferably at least about 95 wt. percent of the isobutylene component. Thus, the preferred polymeric isobutylene compounds contain in the range of 95 to 100 wt. percent of isobutylene component. In those cases where the polymeric isobutylene compound contains a constituent monomer other than isobutylene, this other monomer may be any of those monomers which are known in the art to copolymerize with isobutylene. Examples of such monomers include isoprene, butadiene, styrene and the like.

The polymeric isobutylene compound will generally have a Staudinger molecular weight in the range of about 35,000 to 500,000. Specific examples of polymeric isobutylene compounds which may be employed in this invention include polyisobutylene, a copolymer of isobutylene and isoprene, and a copolymer of isobutylene and styrene. Polyisobutylenes sold under the trade name of Vistanex, and copolymers of isobutylene with isoprene sold under the trade name of Butyl rubber have been found to be particularly useful in preparing the graft copolymers of the present invention. Polyisobutylenes (Vistanex) having a molecular weight in the range of about 60,000 to 350,000, preferably those having a molecular weight above about 100,000, are readily available and may be employed in the present invention. Similarly, Butyl rubber (copolymer of isobutylene with 1 to 3 wt. percent of isoprene, e.g., 1% isoprene) having molecular weights in the range of 35,000 to 500,000; e.g., 35,000 to 80,000, are also readily available and may be employed in the present invention.

The monomers which are grafted to the polymeric isobutylene compounds may be selected from a wide variety of unsaturated materials. The following general classes of monomers have been found to be particularly useful in preparing the graft copolymers of the present invention.

UNSATURATED ESTERS

The unsaturated esters will generally consist of the elements carbon, hydrogen and oxygen, and generally will contain about 4 to 24 carbon atoms per molecule. It will be understood, however, that if desired, the unsaturated esters may contain substituent groups such as primary, secondary, or tertiary amino, hydroxyl, keto, ether, mercaptan, sulfide, sulfoxide or the like. These unsaturated esters may be derived from unsaturated organic acids and/or unsaturated monohydric alcohols.

Esters of unsaturated organic (carboxylic) acids which may be employed include (1) the esters of acrylic or methacrylic acids such as, for example, "Lorol"[1] methacrylate, methyl methacrylate, "Lorol" acrylate, methylacrylate, or diethylaminoethyl methacrylate; (2) esters of alpha, beta unsaturated dibasic (dicarboxylic) acids, such as "Lorol" maleate, "Lorol" fumarate, and dibutyl itaconate; (3) esters of unsaturated monocarboxylic acids (other than acrylic or methacrylic acids) such as butyl sorbate, ethyl oleate, etc. The ethylenically unsaturated carboxylic acids may thus be either mono or dicarboxylic acids containing about 3 to 18 carbon atoms per molecule. The alcohols employed in preparing the esters may be either saturated or unsaturated monohydric alcohols (preferably saturated) containing about 1 to 18 carbon atoms per molecule.

Examples of esters of unsaturated monohydric alcohols which may be employed in the present invention include (1) vinyl esters such as vinyl acetate, vinyl-2-ethyl hexoate, vinyl laurate, vinyl stearate, etc.; (2) allyl esters such as isopropenyl acetate, allyl acetate, allyl-2-ethyl hexoate, allyl stearate, etc. Generally, the ethylenically unsaturated monohydric alcohols will contain about 2 to 12 carbon atoms per molecule. The carboxylic acids employed to prepare the esters may be either monocarboxylic or dicarboxylic acids and may be saturated or unsaturated (preferably saturated) acids containing about 2 to 18 carbon atoms per molecule.

UNSATURATED HYDROCARBONS (1) Monoolefins having about 5 to 18 carbon atoms per molecule, such as octene, octadecene, cyclohexene, styrene, α-methyl styrene, etc.; (2) unsaturated terpenes such as dipentene, alpha pinene, etc.; (3) acetylenes having about 4 to 18 carbon atoms per molecule, such as butyl acetylene, propyl methylacetylene, decyl acetylene, and cetyl acetylene.

UNSATURATED NITROGEN-CONTAINING ORGANIC COMPOUNDS

The ethylenically unsaturated nitrogen-containing organic compounds generally consist of carbon, hydrogen and nitrogen and may also contain oxygen. It will be understood, however, that the nitrogen-containing compounds may also contain substituent groups such as keto, hydroxyl, ether, mercaptan, sulfide or sulfoxide. Generally, these nitrogen-containing compounds will contain about 3 to 24 carbon atoms and about 1 nitrogen atom per molecule.

---
[1] "Lorol" refers to the alcohol portion of the ester which is derived from a mixture of alcohols obtained by the hydrogenation of coconut oil and sold under the name of "Lorol" alcohols.

The unsaturated nitrogen-containing organic compounds useful in this invention may be selected from the following classes: (1) unsaturated nitriles such as acrylonitrile, (2) amides of acrylic and methacrylic acids such as octyl acrylamide, octyl methacrylamide, butyl acrylamide, and (3) vinyl substituted organic compounds having a ring or rings containing nitrogen such as vinyl pyrrolidone, vinyl carbazole, vinyl pyridine, vinyl piperidine, vinyl quinoline, etc.

It will be understood that, if desired, two or more different polymeric isobutylene compounds or two or more different types of monomers may be employed in the present polymeric isobutylene compound-monomer systems. In the preparation of the novel lubricating oil additives of the present invention, about 1 to 80%, preferably about 5 to 60% by weight of the monomer will be blended with about 99 to 20%, preferably about 40 to 95%, of the polymeric isobutylene compound. The mixtures of polymeric isobutylene compound and monomer may be prepared (1) by dissolving the polymeric isobutylene compound and the monomer in a mutual organic solvent such as hexane, light virgin naphtha, benzene, toluene, etc.; (2) by thoroughly mixing the monomer into the polymeric isobutylene compound by milling, kneading, etc., or (3) by preparing an oil-water emulsion wherein the polymeric isobutylene compound and the monomer are present in the oil phase. Thus, water-soluble monomers such as vinyl pyrrolidone would not be generally used in such systems, because for effective interaction of the monomer with the polymeric isobutylene compound, the two should both be in the oil phase. Generally, about 1 to 10 parts of water will be employed for each part by volume of oil phase. Conventional emulsifiers such as sodium lauryl sulfate, sodium oleate, polyoxyethylene glycol monolaurate, etc., can be employed to stabilize the emulsion. The oil used in preparing the emulsion may be hexane, light virgin naphtha, benzene, toluene or light mineral lubricating oil fractions (viscosity=40–50 SUS/210° F.).

Generally, the irradiation of the polymeric isobutylene compound and monomer will be carried out most conveniently at about atmospheric temperature and atmospheric pressure, although temperatures and pressures generally in the range stated heretofore may be employed if desired. Generally, the radiation dosages employed will be about 0.1 to 50 megaroentgens, usually about 1 to 10 megaroentgens. It has been found that when using gamma rays, about 2 to 5 megaroentgens can be employed to prepare very useful lubricating oil additives by the method of the present invention. It will be understood, however, that other equivalent types of radiation such as beta rays, alpha rays, neutrons or combinations thereof may also be employed to prepare the present lubricating oil additives. The irradiation times will depend upon a number of factors such as (1) radiation dosage rate, (2) type of polymeric isobutylene compound, (3) type of monomer, (4) initial molecular weight of the polymeric isobutylene compound, (5) desired molecular weight of the final graft copolymer product, and (6) concentration in and nature of solvents used to dissolve or disperse the reactants.

The polymeric products of the present invention will generally contain about 1 to 80% (e.g., 2 to 40%) by weight of the monomer component and about 99 to 20% (e.g., 60 to 98%) by weight of the polymeric isobutylene component. During the irradiation, the polymeric isobutylene compound will generally be reduced in molecular weight while simultaneously grafting thereto the monomer. Thus, the molecular weight of the irradiated polymeric product will be generally lower than the initial molecular weight of the polymeric isobutylene compound. Generally, the molecular weights of the polymeric products of the present invention, when employed as lubricant additives, will be in the range of about 10,000 to 30,000 Staudinger (e.g., 15,000 to 20,000 Staudinger).

However, it will be understood that higher or lower molecular weight products may be prepared in accordance with the present invention, if desired.

This particular aspect of the present invention will be more fully understood by reference to the following examples. It is pointed out, however, that the examples are given for the purpose of illustration only and are not to be construed as limiting the scope of the present invention.

*Examples 3 to 6*

In these examples, graft copolymers of Butyl rubber were prepared. The Butyl rubber, which was a copolymer of 99 wt. percent isobutylene and 1 wt. percent isoprene, had a molecular weight of about 43,000. The following monomers were employed in Examples 3 to 6, respectively:

| Example: | Monomer |
|---|---|
| 3 | "Lorol"[1] methacrylate. |
| 4 | "Lorol"[1] fumarate. |
| 5 | "Lorol"[1] maleate. |
| 6 | Octadecene. |

[1] "Lorol" refers to the alcohol portion of the esters which is derived from a mixture of $C_8$ to $C_{18}$ alcohols obtained by the hydrogenation of coconut oil and sold under the name of "Lorol" alcohols.

The monomers were dissolved in the Butyl rubber in 10 wt. percent concentration (based on Butyl rubber) by mixing thoroughly on a micromill. The mixture of monomer and Butyl rubber in each of the four examples was then irradiated with gamma rays at about 80° F. and at atmospheric pressure for about 18 hours, the total radiation dosage in each case being 6.2 megaroentgens.

The four graft copolymers prepared as described above were then evaluated as lubricating oil additives at 3.6 weight percent concentration in Oil A for the viscosity index determination and at 1.0 weight percent in Oil B for the determination of pour depressing properties. Oil A was a solvent refined (phenol extracted and dewaxed) mineral lubricating oil having an SSU viscosity at 210° F. of about 46 seconds and derived from Mid-Continent crude, and Oil B was a solvent refined mineral lubricating oil of SAE-20 grade derived from Mid-Continent crude.

The following results were obtained:

TABLE III

[Butyl rubber graft copolymers]

| Example No. | System irradiated, butyl rubber (43,000) plus 10% monomer | Product inspections | | |
|---|---|---|---|---|
| | | 3.6% in oil A | | 1.0% in oil B, ASTM pour pt. (° F.) |
| | | Vis./210° F. (SUS) | V.I. | |
| | Base oils alone | 46.8 | 112 | +15 |
| 3 | Lorol methacrylate | 103.5 | 136 | +5 |
| 4 | Lorol fumarate | 85.9 | 135 | +5 |
| 5 | Lorol maleate | 83.4 | 135 | +10 |
| 6 | Octadecene | 81.6 | 134 | −30 |

The data in Table III show that all products are effective V.I. improvers and, in certain cases, may also act as excellent pour point depressants. With octadecene as the monomer added to Butyl rubber before irradiation, a particularly potent pour point depressant is obtained.

*Examples 7 to 10*

Certain polar compounds (monomers) as shown below were mixed with a hexane solution of a Vistanex (polyisobutylene of about 70,000 molecular weight Staudinger). The mixtures were then subjected to gamma rays at room temperature and atmospheric pressure until several megaroentgens were absorbed (exact value shown below). The irradiated mixtures were then precipitated in excess methanol (about 5–10 volumes of methanol to 1 volume of the irradiated mixture) and the polymeric products which precipitated were vacuum dried at about 60° C.

Solutions of the polymeric products were then prepared in a mineral lubricating oil and the viscosity indices were determined from the kinematic viscosity data obtained. The mineral lubricating oil (hereinafter referred to as Oil C) was a solvent refined (phenol treated and dewaxed) mineral lubricating oil having an SSU viscosity at 210° F. of about 42 seconds and derived from Mid-Continent crude. The synthesis data for the preparation of the polymeric products is shown below in Table IV.

TABLE IV

[Synthesis data for Vistanex reaction products]

| Ex. | Polar compound used | Grams of polar compounds | Grams of Vistanex solution[1] | Gamma ray dose, megaroentgen | Percent polar compound in product[2] |
|---|---|---|---|---|---|
| 7 | Di-n-butyl itaconate | 25 | 63 | 4.86 | 29 |
| 8 | Isopropenyl acetate | 25 | 61 | 5.26 | 3.6 |
| 9 | Butyl sorbate | 25 | 61 | 2.79 | 15 |
| 10 | Allyl acetate | 25 | 63 | 2.89 | 3 |

[1] 20.2 weight percent of Vistanex polyisobutylene in commercial hexane.
[2] Computed from oxygen analyses of products.

The viscosity index values of solutions of the above products in Oil C are given below in Table V.

TABLE V

[Viscosity index values for Vistanex reaction products in Oil C]

| Example | Reaction product and its identification | Weight percent in the oil | Viscosity index |
|---|---|---|---|
| | None (oil C control) | 0 | 110 |
| 7 | Vistanex-dibutyl itaconate | 2 | 128 |
| 8 | Vistanex-isopropenyl acetate | 2 | 131 |
| 9 | Vistanex-butyl sorbate | 2 | 132 |
| 9 | do | 5 | 137 |
| 10 | Vistanex-allyl acetate | 2 | 132 |
| 10 | do | 5 | 136 |

For purposes of comparison, a commercial polyisobutylene V.I. improver in Oil C gives viscosity index values of 131 and 134 at 2 wt. percent and 5 wt. percent concentrations, respectively.

The above data show that graft copolymers prepared by the above techniques are more effective lubricating oil V.I. improving additives than a commercial polyisobutylene V.I. improver. (At 5% concentration in Oil C, the compositions of the present invention give a viscosity index of 136 to 137 vs. only 134 for the commercial polyisobutylene V.I. improver.)

*Examples 11 to 22*

A number of other graft copolymers were then prepared in accordance with the present invention. In this case, the polymeric isobutylene compound employed was a Vistanex (polyisobutylene of 118,000 molecular weight Staudinger) and the monomers employed were as follows:

| Example: | Monomer |
|---|---|
| 11 | Methyl methacrylate. |
| 12 | Acrylonitrile. |
| 13 | Vinyl-2-ethyl hexoate. |
| 14 | Vinyl acetate. |
| 15 | Vinyl pyrrolidone. |
| 16 | Vinyl carbazole. |
| 17 | Octyl acrylamide. |
| 18 | Vinyl pyridine. |
| 19 | Octene-1. |
| 20 | Styrene. |
| 21 | α-Pinene. |
| 22 | Butyl acetylene. |

The systems which were irradiated consisted of 4% by weight of the monomer, 10% by weight of the Vistanex and 86% by weight of hexane (solvent). The individual systems were then irradiated with gamma rays at about 70° F., and atmospheric pressure until several megaroentgens were absorbed (exact values shown below). After the irradiation, the hexane solution was added to a mineral lubricating oil (hereinafter referred to as Oil D); the blend was stripped of hexane and unreacted monomers to constant weight under nitrogen at 210° F., and the resulting solution filtered.

The graft copolymers produced as described above were then evaluated at 3.5 wt. percent concentration in Oil D, which was a refined SAE-10 mineral lubricating oil. The viscosity index, pour point and sludge dispersancy properties of the various lubricating oil blends were then determined. The sludge dispersancy test employed was carried out as follows: Ten grams of standard engine sludge and 90 grams of test oil in a 300 cc. tall form beaker are placed in a 200° F. bath for one-half hour and then stirred together vigorously for 10 minutes. After stirring 90 cc. of the mixture are placed in a 100 cc. graduate in a 200° F. bath. After 24 hours the top 25 cc. of suspension from the graduate is diluted with 75 cc. of heptane in a centrifuge tube. After centrifuging for one-half hour at 1700 r.p.m., the volume of sludge in the bottom of the centrifuge tube is a measure of the ability of the test oil to hold sludge in suspension.

The results of these experiments are shown below in Table VI:

TABLE VI
[Graft copolymers of Vistanex]

| Ex. No. | Monomer (4.0%) 118,000 MW, Vistanex (10%) in hexane | Radiation dose at 70° F. (MR) | Product evaluation (3.5% product in oil D) | | | |
|---|---|---|---|---|---|---|
| | | | Vis./ 210° F. (SUS) | V.I. | ASTM pour (° F.) | Dry sludge dispersancy test (vol. percent sludge suspended) |
| | Oil D alone | | 47.9 | 113 | +15 | 5-10 |
| 11 | Methyl methacrylate | 4.76 | 80.9 | 131 | -10 | 10 |
| 12 | Acrylonitrile | 4.76 | 92.8 | 133 | +15 | 100 |
| 13 | Vinyl-2-ethyl hexoate | 4.76 | | 131 | -5 | 3 |
| 14 | Vinyl acetate | 4.70 | 80.4 | 131 | -15 | 15 |
| | | 2.32 | 106.0 | 133 | -10 | 20 |
| | | 1.64 | 128.9 | 132 | -10 | 3 |
| 15 | Vinyl pyrrolidone | 4.70 | 79.6 | 131 | -10 | 55 |
| | | 1.64 | 121.5 | 133 | -10 | 100 |
| 16 | Vinyl carbazole | 4.70 | 96.2 | 133 | +15 | 70 |
| 17 | Octyl acrylamide | 4.70 | 82.3 | 131 | -15 | 70 |
| 18 | Vinyl pyridine | 4.76 | 102.7 | 132 | -5 | 90 |
| 19 | Octene-1 | 4.70 | 79.1 | 131 | -10 | 3 |
| 20 | Styrene | 4.76 | 115.3 | 133 | -10 | 5 |
| 21 | α-Pinene | 4.70 | 90.2 | 132 | -10 | 3 |
| 22 | Butyl acetylene | 4.70 | 78.4 | 131 | -10 | 3 |

The data presented above in Table VI show that all products of this invention are effective V.I. improvers. The products obtained using methyl methacrylate, vinyl-2-ethyl hexoate, vinyl acetate, octene, styrene, α-pinene, and butyl acetylene (Examples 11, 13, 14, 19, 20, 21, 22) also demonstrated pour depressing properties. Those prepared using acrylonitrile and vinyl carbazole (Examples 12 and 16) were sludge dispersants as well as V.I. improvers and those products prepared using vinyl pyrrolidone, octyl acrylamide, and vinyl pyridine (Examples 15, 17 and 18) were multifunctional lubricant additives demonstrating V.I. improver, pour depressant and sludge dispersant properties.

Examples 23 to 30

In these examples, the polymeric isobutylene compound employed was a Vistanex (polyisobutylene having a Staudinger molecular weight of about 305,000) and the monomers were as follows:

| Example: | Monomer |
|---|---|
| 23 | Octene. |
| 24 | Butyl acetylene. |
| 25 | α-Pinene. |
| 26 | Dipentene. |
| 27 | Vinyl acetate. |
| 28 | Vinyl-2-ethyl hexoate. |
| 29 | Acrylonitrile. |
| 30 | Vinyl pyrrolidone. |

In these examples, the monomers were mixed thoroughly with the Vistanex by milling on a micromill. In each case, the proportions of Vistanex to monomer on a weight basis were 1:1. The mixtures were then subjected to gamma rays at room temperature and atmospheric pressure until several megaroentgens were absorbed (exact values shown below). After irradiation, the products in each case were dissolved in hexane, the hexane solution then added to Oil D, the blend stripped to remove hexane and unreacted monomers to constant weight under nitrogen at 210° F., and the resultant solution filtered.

Blends of the graft copolymers prepared as described above at 3 wt. percent concentration in Oil D were then evaluated as was done in Examples 11 to 22. The molecular weights of these products were estimated by comparison of their viscosities at 3% in Oil D with the viscosities of commercial polyisobutylene V.I. improvers of known molecular weight at the same concentration in Oil D.

TABLE VII
[Graft copolymers of Vistanex]

| Example No. | System irradiated, Vistanex (305,000) swollen with monomer (1/1) | Radiation dose at 70° F. (MR) | Product evaluation (3.5% product in oil D) | | | | |
|---|---|---|---|---|---|---|---|
| | | | Vis./ 210° F. (SUS) | Molecular weight | V.I. | ASTM pour (° F.) | Dry sludge dispersancy test (vol. percent sludge suspended) |
| | Oil D alone | | 47.9 | | 113 | +15 | 5-10 |
| 23 | Octene | 5.20 | 104.5 | 20,700 | 134 | -15 | 5 |
| 24 | Butyl acetylene | 5.20 | 83.8 | 14,100 | 132 | -15 | 55 |
| 25 | α-Pinene | 4.93 | 146.1 | 29,800 | 133 | -5 | 3 |
| 26 | Dipentene | 4.93 | 146.4 | 29,900 | 133 | +10 | 40 |
| 27 | Vinyl acetate | 4.36 | 91.0 | 16,600 | 134 | -5 | 5 |
| 28 | Vinyl-2-ethyl hexoate | 5.20 | 108.3 | 21,700 | 134 | -5 | 3 |
| 29 | Acrylonitrile | 4.36 | 101.9 | 19,800 | 134 | -5 | 5 |
| 30 | Vinyl pyrrolidone | 4.17 | 110.8 | 22,200 | 150 | +10 | 65 |

The data presented in Table VII show again that all products prepared in the absence of added solvent under the conditions of this invention are effective V.I. improvers. Those products prepared using octene, α-pinene, vinyl acetate, vinyl-2-ethyl hexoate, and acrylonitrile (Examples 23, 25, 27, 28, 29) are also pour depressants while those prepared using dipentene and vinyl pyrrolidone (Examples 26 and 30) are also sludge dispersants. The product obtained when butyl acetylene was added to Vistanex prior to irradiation (Example 24) was a multifunctional additive demonstrating V.I. improver, pour depressant and sludge dispersant properties.

When additives of the present invention are employed in lubricating oils, they are preferably added in proportions of about 0.01 to about 20.0% or more, preferably about 0.5 to 10.0%, and more preferably about 1.0 to 6.0% by weight. The proportions giving the best results will vary somewhat according to the nature of the additive, the nature of the lubricating oil base stock to which it is added and the specific purpose which the lubricant is to serve in a given case. For commercial purposes, it is convenient to prepare concentrated oil solutions in which the amount of additive in the composition ranges from 25% to 50% by weight, and to transport and store them in such form. In preparing a lubricating oil composition for use as a crankcase lubricant the additive concentrate is merely blended with the base oil in the required amount.

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, thiophosphates, phosphites and thiophosphites, metal salicylates, metal xanthates and thioxanthates, metal thiocarbamates, amines and amine derivatives, reaction products of metal phenates and sulfur, reaction products of metal phenates and phosphorus sulfides, metal phenol sulfonates and the like. Thus the additives of the present invention may be used in lubricating oils containing such other addition agents as barium nonyl phenol sulfide, calcium tert.-amylphenol sulfide, nickel oleate, barium octadecylate, calcium phenyl stearate, zinc diisopropyl salicylate, aluminum naphthenate, calcium cetyl phosphate, barium di-tert.- amylphenol sulfide, calcium petroleum sulfonate, zinc methylcyclohexyl thiophosphate, calcium dichlorostearate, etc. Other types of additives such as phenols and phenol sulfides may be employed.

The lubricating oil base stocks used in the compositions of this invention may be straight mineral lubricating oils or distillates derived from paraffinic, naphthenic, asphaltic, or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc. Hydrogenated oils, white oils, or shale oil may be employed as well as synthetic oils prepared, for example, by the polymerization of olefins or by the reaction of oxides of carbon with hydrogen or by the hydrogenation of coal or its products. Also, for special applications, animal, vegetable or fish oils or their hydrogenated or voltolized products may be employed in admixture with mineral oils.

Synthetic lubricating oils may also be employed which have a viscosity of at least 30 SSU at 100° F. such as esters of monobasic acids (e.g., ester of $C_8$ Oxo alcohol with $C_8$ Oxo acid, ester of $C_{13}$ Oxo alcohol with octanoic acid, etc.), esters of dibasic acids (e.g., di-2-ethyl hexyl sebacate, di-nonyl adipate, etc.), esters of glycols (e.g., $C_{13}$ Oxo acid diester of tetraethylene glycol, etc.), complex esters (e.g., the complex ester formed by reacting one mole of sebacic acid with two moles of tetraethylene glycol and two moles of 2-ethyl-hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ Oxo alcohol, and one mole of $C_8$ Oxo acid), esters of phosphoric acid (e.g., the ester formed by contacting three moles of the mono methyl ether of ethylene glycol with one mole of phosphorus oxychloride, etc.), halocarbon oils (e.g., the polymer of chlorotrifluoroethylene containing twelve recurring units of chlorotrifluoroethylene), alkyl silicates (e.g., methyl polysiloxanes, ethyl polysiloxanes, methyl-phenyl polysiloxanes, ethyl-phenyl polysiloxanes, etc.), sulfite esters (e.g., ester formed by reacting one mole of sulfur oxychloride with two moles of the methyl ether of ethylene glycol, etc.), carbonates (e.g., the carbonate formed by reacting $C_8$ Oxo alcohol with ethyl carbonate to form a half ester and reacting this half ester with tetraethylene glycol), mercaptals (e.g., the mercaptal formed by reacting 2-ethyl hexyl mercaptan with formaldehyde), formals (e.g., the formal formed by reacting $C_{13}$ Oxo alcohol with formaldehyde), polyglycol type synthetic oils (e.g., the compound formed by condensing butyl alcohol with fourteen units of propylene oxide, etc.), or mixtures of any of the above (or with mineral, animal or vegetable oils) in any proportions may also be used.

For the best results the base stock chosen should normally be that oil which without the new additive present gives the optimum performance in the service contemplated. However, since one advantage of the additives is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubricating of certain low and medium speed diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel engine and other gasoline engine service, oils of higher viscosity index are often preferred, for example, up to 75 to 100, or even higher, viscosity index.

In addition to the material to be added according to the present invention, other agents may also be used such as dyes, pour depressors, heat thickened fatty oils, sulfurized fatty oils, organo-metallic compounds, metallic or other soaps, sludge dispersers, anti-oxidants, thickeners, other viscosity index improvers, oiliness agents, resins, rubber, olefin polymers, voltolized fats, voltolized mineral oils, and/or voltolized waxes and colloidal solids such as graphite, molybdenum disulfide, or zinc oxide, etc. Solvents and assisting agents, such as esters, ketones, alcohols, aldehydes, halogenated or nitrated compounds, and the like may also be employed.

In addition to being employed in lubricants, the additives of the present invention may also be used in motor fuels, hydraulic fluids, torque converter fluids, cutting oils, flushing oils, turbine oils or transformer oils, industrial oils, process oils, heating oils, diesel oils, and generally as detergents, sludge dispersants, viscosity-index improvers and/or pour depressants in mineral oil products. They may also be used in gear lubricants and greases.

What is claimed is:

1. A method of preparing a polymeric lubricating oil additive comprising irradiating with high intensity ionizing radiation an intimate mixture of 0.1 to 99.9% of an isobutylene polymer having a molecular weight in the range of 500 to $5 \times 10^6$ and 99.9% to 0.1% of a polymerizable monomer other than a butene within the range of $5 \times 10^4$ to $5 \times 10^7$ roentgens at an ionizing radiation intensity of $10^3$ to $10^8$ roentgens per hour, and recovering a polymer having a molecular weight in the range of 35,000 to 500,000 and consisting of said monomer grafted to said isobutylene polymer.

2. The process of claim 1 wherein said ionizing radiation consists essentially of gamma rays.

3. A polymeric lubricating oil additive having a molecular weight in the range of 35,000 to 500,000, obtained by irradiating with high intensity ionizing radiation an intimate mixture of 0.1 to 99.9% of an isobutylene polymer having a molecular weight in the range of 500 to $5 \times 10^6$ and 99.9 to 0.1% of a polymerizable monomer other than a butene within the range of $5 \times 10^4$ to $5 \times 10^7$ roentgens at an ionizing radiation intensity of $10^3$ to $10^8$ roentgens per hour to graft said monomer to said isobutylene polymer.

4. The additive of claim 3 wherein said ionizing radiation consists essentially of gamma rays.

5. A polymeric product produce useful as a lubricating oil additive obtained by subjecting to high intensity ionizing radiation comprising gamma rays, a mixture of (1) 40 to 90% of a substantially saturated polymeric isobutylene compound containing at least 95% of isobutylene component and having a molecular weight of about 35,000 to 500,000 and (2) 60 to 10% of an unsaturated organic ester, the radiation dosage being about 1 to 10 megaroentgens, said product having a molecular weight of about 10,000 to 30,000.

6. Product according to claim 5 wherein said unsaturated organic ester is selected from the group consisting of Lorol methacrylate, methyl methacrylate, Lorol maleate, Lorol fumarate, dibutyl itaconate, vinyl acetate, vinyl-2-ethyl hexoate, isopropenyl acetate, allyl acetate and butyl sorbate.

7. A polymeric product useful as a lubricating oil additive obtained by subjecting to high intensity ionizing radiation comprising gamma rays, a mixture of (1) 40 to 90% of a substantially saturated polymeric isobutylene compound containing at least 95% of isobutylene component and having a molecular weight of about 35,000 to 500,000 and (2) 60 to 10% of an unsaturated hydrocarbon, the radiation dosage being about 1 to 10 megaroentgens, said product having a molecular weight of about 10,000 to 30,000.

8. Product according to claim 7 wherein said unsaturated hydrocarbon is selected from the group consisting of octene, octadecene, styrene, dipentene, alpha pinene and butyl acetylene.

9. A polymeric product useful as a lubricating oil additive obtained by subjecting to a high intensity ionizing radiation comprising gamma rays, a mixture of (1) 0.1 to 99.9% of a substantially saturated polymeric isobutylene compound containing at least 95% of isobutylene component and having a molecular weight of about 35,000 to 500,000 and (2) 99.9 to 0.1% of an unsaturated, nitrogen-containing organic compound, the radiation dosage being about 1 to 10 megaroentgens, said product having a molecular weight of about 10,000 to 30,000.

10. Product according to claim 9 wherein said unsaturated, nitrogen-containing organic compound is selected from the group consisting of acrylonitrile, vinyl pyrollidone, vinyl carbazole, vinyl pyridine and octylacrylamide.

References Cited in the file of this patent

UNITED STATES PATENTS

| 2,350,330 | Remy | June 6, 1944 |
| 2,618,624 | Sparks et al. | Nov. 18, 1952 |
| 2,666,025 | Nozaki | Jan. 12, 1954 |
| 2,686,759 | Giammari | Aug. 17, 1954 |
| 2,743,223 | McClinton et al. | Apr. 24, 1956 |
| 2,746,925 | Garber et al. | May 22, 1956 |
| 2,837,496 | Vandenberg | June 3, 1958 |
| 2,849,419 | Hayes et al. | Aug. 26, 1958 |
| 2,926,126 | Graham et al. | Feb. 23, 1960 |

FOREIGN PATENTS

| 582,559 | Great Britain | Nov. 20, 1946 |
| 665,262 | Great Britain | Jan. 23, 1952 |
| 750,923 | Great Britain | June 20, 1956 |
| 1,125,537 | France | July 16, 1956 |

OTHER REFERENCES

Schmitz et al.: "Science," vol. 113, pages 718, 719, June 22, 1951.

Chem. and Eng. News, vol. 33 (April 1955), page 1428.

October 1953, Nucleonics, The Industrial Future, vol. 11, page 20.

Brookhaven National Laboratory Report No. 229, page 12, March 1953.

"Irradiation of Polymers by High Energy Electronics," by Lawton et al., Nature, vol. 172, July 11, 1953, pages 76 and 77 pertinent.

"High Energy Radiation and Long Chain Polymers," by Charlesby, Feb. 23–24, 1953, page 118.

"Fission Products Utilizaton Project," by Ballantine et al., BNL 375 (S–28), April 1956, page 26.

Journal of Polymer Science, January 1956, pages 219–224.